United States Patent [19]
Emerling et al.

[11] Patent Number: 6,019,418
[45] Date of Patent: Feb. 1, 2000

[54] MODULAR VEHICLE LIFTGATE MODULE

[75] Inventors: David M. Emerling, West Bloomfield; Gerald O. Morrison, Birmingham; Carter S. Cannon, Southfield; David P. Thomas, Jr., Canton, all of Mich.

[73] Assignee: Lear Corporation, Southfield, Mich.

[21] Appl. No.: 09/027,079

[22] Filed: Feb. 20, 1998

Related U.S. Application Data

[60] Provisional application No. 60/057,023, Jul. 31, 1997.

[51] Int. Cl.$^7$ ............................... B60J 5/02; E05D 15/10
[52] U.S. Cl. ................................... 296/146.8; 296/146.7; 296/56
[58] Field of Search ................. 296/56, 146.5–146.8, 296/106, 152, 76; 49/502

[56] References Cited

U.S. PATENT DOCUMENTS

| | | | |
|---|---|---|---|
| 3,408,100 | 10/1968 | Mckey | 296/106 |
| 3,680,910 | 8/1972 | Staner | 296/76 |
| 4,206,944 | 6/1980 | Kumagai et al. | 296/76 |
| 4,353,111 | 10/1982 | Gallitzendorfer et al. | 296/76 |
| 4,620,743 | 11/1986 | Eke | 296/56 |
| 4,664,437 | 5/1987 | Quevean | 296/76 |
| 4,799,730 | 1/1989 | Harasaki | 296/76 |
| 4,815,984 | 3/1989 | Sugiyama et al. | 49/502 |
| 4,822,098 | 4/1989 | Vogt et al. | 296/76 |
| 4,880,267 | 11/1989 | Ohya | 296/146.8 |
| 4,966,403 | 10/1990 | Nordstrom | 296/76 |
| 5,147,106 | 9/1992 | Bartelt et al. | 296/56 |
| 5,183,310 | 2/1993 | Shaughnessy | 296/106 |
| 5,211,436 | 5/1993 | Feder | 296/106 |
| 5,295,374 | 3/1994 | Bender et al. | 296/106 |
| 5,536,060 | 7/1996 | Rashid et al. | 296/146.6 |
| 5,584,144 | 12/1996 | Hisano | 49/502 |

FOREIGN PATENT DOCUMENTS

| | | | |
|---|---|---|---|
| 002695877 A1 | 3/1994 | France | 296/146.5 |
| 0191125 | 11/1982 | Japan | 296/146.8 |
| 0053112 | 3/1988 | Japan | 49/502 |
| 402117417 | 5/1990 | Japan | 296/146.8 |
| 4060553938 | 3/1994 | Japan | 296/146.5 |

*Primary Examiner*—Joseph D. Pape
*Assistant Examiner*—Kiran Patel
*Attorney, Agent, or Firm*—Brooks & Kushman PC

[57] ABSTRACT

An improved structural liftgate trim module for and a method of assembly a vehicle liftgate assembly of a liftgate for a motor vehicle having a modular structure consisting of an inner liftgate trim panel, an inner liftgate trim panel reinforcement member and an outer liftgate trim panel. The inner liftgate trim panel reinforcement member may include electrical components mounted to the reinforcement prior to assembly on the inner liftgate trim panel. The inner liftgate trim panel and inner liftgate trim panel reinforcement member are connected prior to assembly with an outer liftgate trim panel member by a mounting clip and at least one fastener. The inner liftgate trim panel reinforcement member includes flanged portions which are adapted to interface at accessible locations with flanged portions on the outer liftgate trim panel for easy-on, easy-off assembly. The structural liftgate trim module formed by the inner liftgate trim panel and inner liftgate trim panel reinforcement member is connected to the outer liftgate trim panel member by connecting at least one fastener from the structural liftgate trim module with a corresponding aperture on the outer liftgate trim panel and connecting each of the flanged portions on the module to the flanged portions on the outer liftgate trim panel to complete assembly of the vehicle liftgate.

39 Claims, 13 Drawing Sheets

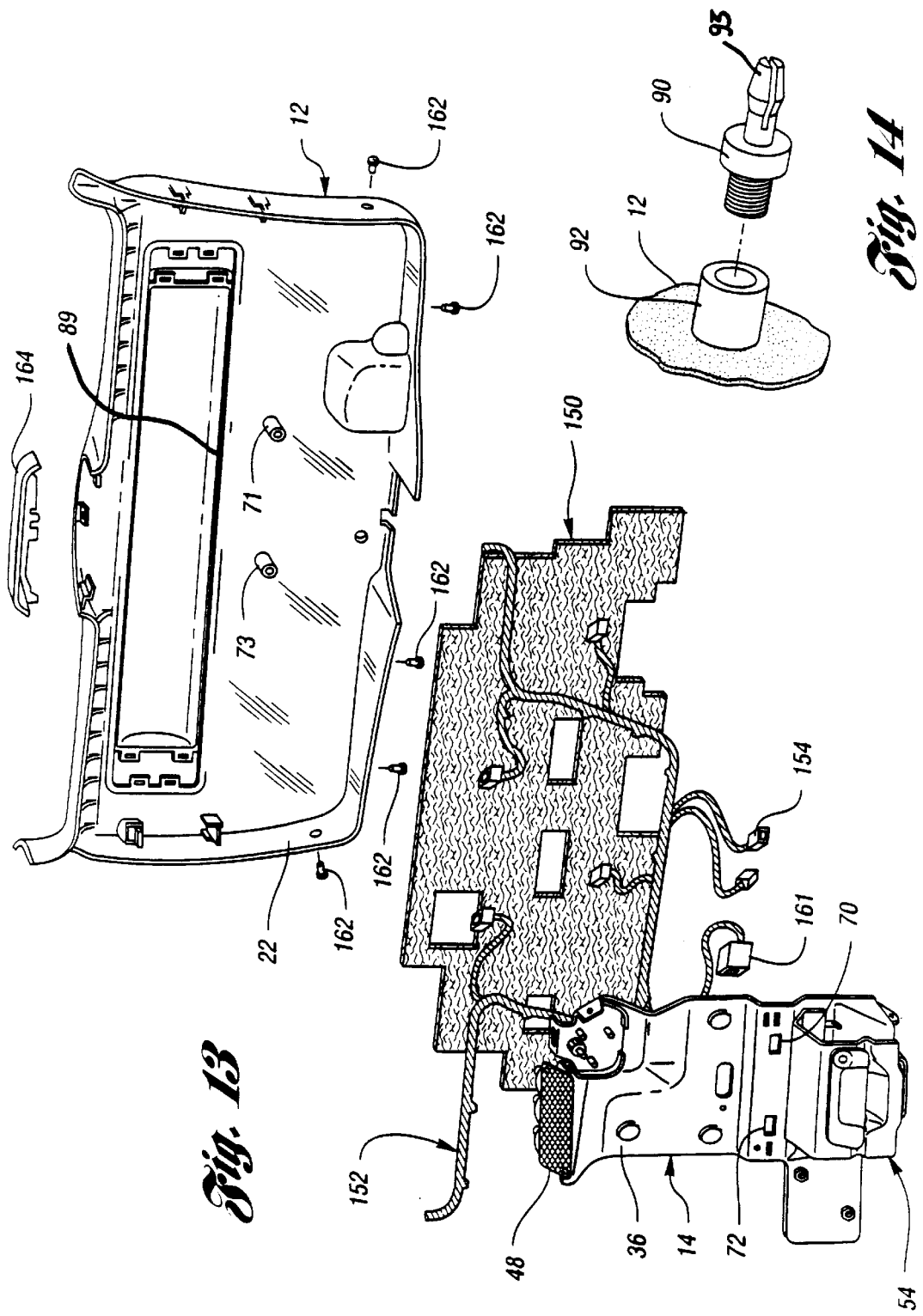

MODULAR VEHICLE LIFTGATE MODULE

CROSS-REFERENCE TO RELATED APPLICATION

This application claims the benefit of U.S. provisional application Ser. No. 60/057,023, filed Jul. 31, 1997.

TECHNICAL FIELD

This invention relates to automotive liftgates, tailgates, or hatchbacks, and more particularly to a modular motor vehicle liftgate assembly.

BACKGROUND ART

Automotive liftgates normally include sheet metal inner and outer panels, an interior trim panel which faces into the passenger compartment, and various hardware situated between the panels. For example, U.S. Pat. No. 4,822,098 shows a double-walled structural body panel, such as a tailgate, for motor vehicles. Conventionally, these components of the liftgate have been assembled at the same time and place.

DISCLOSURE OF THE INVENTION

This invention provides an improved liftgate, tailgate or hatchback structure and method of assembling a modular liftgate, tailgate or hatchback assembly for a motor vehicle. A supplier pre-builds a structural liftgate trim module with electrical components which have been pretested before the module is delivered just in time to the vehicle manufacturer. The manufacturer then adds the module to an outer liftgate panel to complete the vehicle liftgate assembly for the vehicle.

In this improvement, the outer liftgate panel provided by the vehicle manufacturer may have a periphery with a first portion substantially accessible on the outer liftgate panel at one location and a second portion spaced from the first portion, and also substantially accessible on the outer liftgate panel. The supplier provided structural liftgate trim module comprises an inner liftgate trim panel having an inner appearance side and an outer side adapted to receive a member having a structural characteristic. The inner appearance side is adapted to face into a passenger compartment of the motor vehicle and the outer side is adapted to face the outer liftgate panel provided by the vehicle manufacturer.

An inner liftgate trim panel reinforcement member is mounted by the module supplier on the outer side of the inner liftgate trim panel to provide the structural characteristic of the structural liftgate trim module and ultimately of the complete vehicle liftgate assembly. The inner liftgate trim panel reinforcement member may include electrical components mounted to the reinforcement prior to assembly on the inner liftgate trim panel. Flange portions are formed on the reinforcement member which are adapted to interface at accessible locations with corresponding portions on the outer liftgate panel which the vehicle manufacturer has provided.

After the module has been delivered, the vehicle manufacturer positions the assembled structural liftgate module adjacent the outer liftgate trim panel so that a first reinforcement flange portion of the reinforcement member is readily accessible and interfaces with a first outer liftgate panel portion at its location and positions a second reinforcement flange portion of the reinforcement member so that it is readily accessible and interfaces with a second outer liftgate panel flange portion at its location. The vehicle manufacturer next secures the structural liftgate module to the outer liftgate panel by fastening each of the reinforcement flange portions on the reinforcement member to the flange portions on the outer liftgate panel at the respective spaced locations to reinforce the outer liftgate panel with the structural liftgate trim module. Readily accessible fasteners at the interfaced flange portions also facilitate the detachment of the module from the outer liftgate panel whenever servicing of the electrical components is necessary.

Accordingly, it is an object of the present invention to provide an improved liftgate, tailgate, or hatchback assembly which is formed in part of molded plastic.

Another object of the present invention is to provide an improved liftgate, tailgate, or hatchback assembly which simplifies the final assembly of the complete vehicle liftgate.

Still another object of the present invention is to provide a liftgate, tailgate, or hatchback assembly in which the electrical components can be tested on a structural liftgate trim module prior to assembly with an outer liftgate panel to complete the vehicle liftgate assembly.

Another object of this invention is a structural liftgate trim module as a subassembly for combining with and reinforcing an outer liftgate panel of a motor vehicle to make a complete vehicle liftgate assembly. The structural liftgate trim module includes an inner liftgate trim panel having an inner appearance side and an outer side adapted to receive a reinforcement member having a structural characteristic. The inner appearance side is adapted to face into a passenger compartment of the motor vehicle and the outer side is adapted to face the outer liftgate panel. An inner liftgate trim panel reinforcement member is mounted on the outer side of the inner liftgate trim panel to provide the structural characteristic. The reinforcement member has flanged portions adapted to interface with the outer liftgate panel in respective locations on the outer liftgate panel with each flanged portion on the reinforcement being readily accessible and operable to detachably and structurally secure the structural trim module in an easy-on, easy-off combination with the outer liftgate panel.

A variation of the invention referenced by the last object positions the locations of the flanged portions on opposite sides of the outer liftgate panel so that the flanged portions of the inner liftgate trim reinforcement member are more readily accessible when securing the structural trim module in combination with the outer liftgate panel during final assembly of the vehicle liftgate, tailgate, or hatchback.

These and other objects, features, a nd advantages of the present invention are readily apparent from the following detailed description of the best modes for carrying out the invention when taken in conjunction with the accompanying drawings.

BRIEF DESCRIPTION OF THE DRAWING

FIG. 13 is an exploded perspective view of the structural liftgate trim module showing the first embodiment of the reinforcement member with electrical components mounted thereon, including a wiring harness component, water acoustic management system and upper close out trim prior to assembly thereof on the inner liftgate trim panel and showing additional fasteners around the periphery of the inner liftgate trim panel which may be used to complete the assembly of the structural liftgate trim module to the outer liftgate panel; and FIG. 14 is a perspective view of the fastener assembly used to connect the inner liftgate trim panel to the outer liftgate panel for the modular vehicle liftgate assembly of the present invention.

BEST MODES FOR CARRYING OUT THE INVENTION

Figure 1:
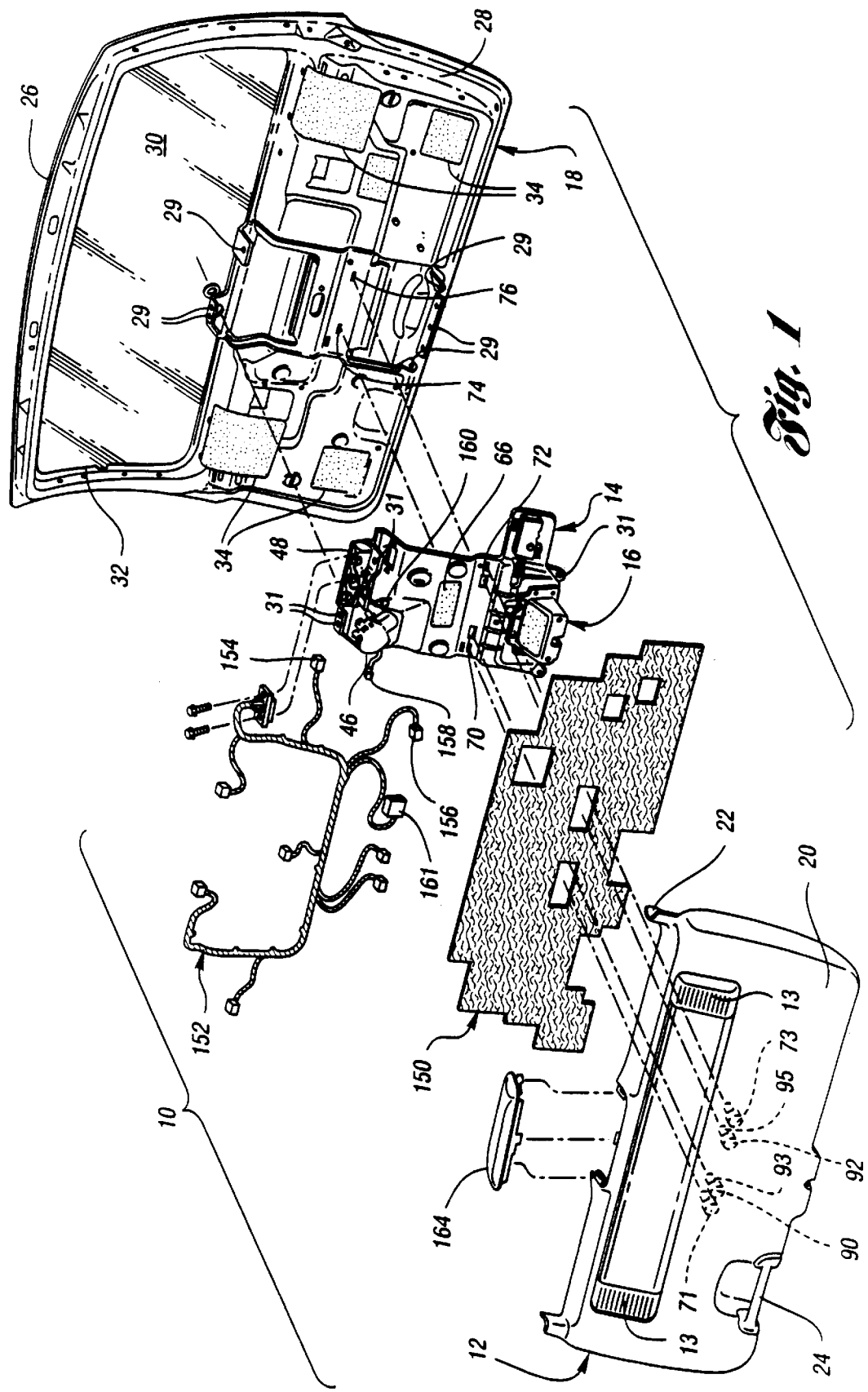
FIG. 1 is an exploded perspective view of a modular liftgate assembly for a motor vehicle including a structural liftgate trim module according to the present invention.
Figure 2:
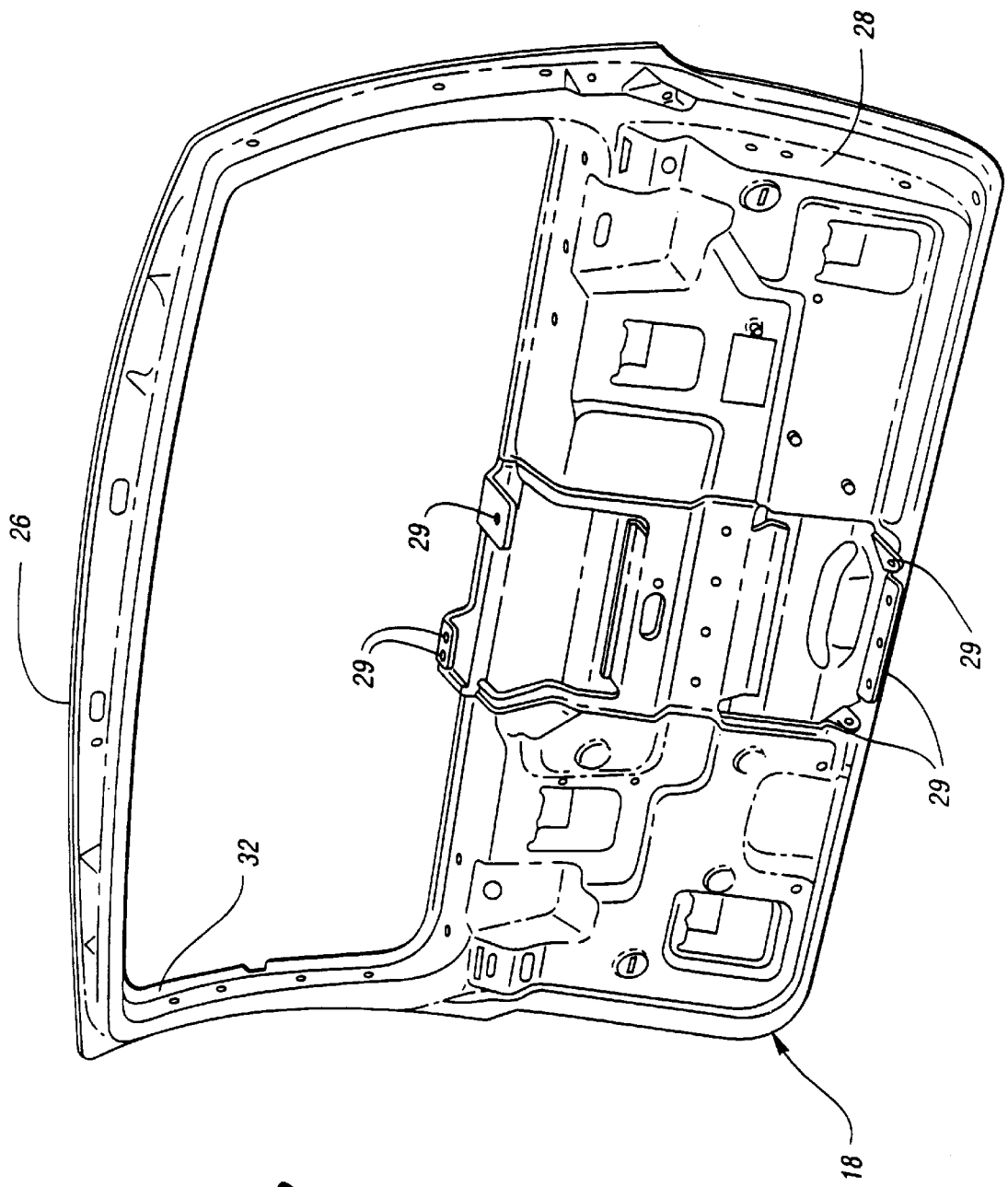
FIG. 2 is a perspective view of an outer liftgate trim panel subassembly.

With reference to the drawings, the preferred embodiments of the present invention will be described. FIG. 1 shows a modular liftgate, tailgate, or hatchback assembly including a structural liftgate trim module 10 according to the present invention for a motor vehicle. The complete vehicle liftgate assembly includes an outer liftgate panel 18 and a structural liftgate trim module subassembly 10. The liftgate subassembly or structural liftgate trim module comprises an inner liftgate trim panel or substrate 12, and a inner liftgate trim panel reinforcement member 14 including a lock and catch portion 16. The liftgate subassembly 10 attaches and is secured to the outer liftgate panel 18 to reinforce and complete assembly of a vehicle liftgate. The inner liftgate trim panel 12 is preferably a unitary, injection molded piece comprising an polyolefin thermoplastic such as polypropylene which is relatively rigid after curing, an engineered acrylonitrile-butadiene-styrene (ABS), or a glass-reinforced composite. Alternatively, inner liftgate trim panel 12 may be compression molded or formed of a glass-reinforced urethane (GRU).

The inner liftgate trim panel 12 has a first or front side 20 and a second or back side 22. The front side 20 has an appearance finish and is adapted to face into a passenger compartment of the motor vehicle, and may include as attachments or integral parts thereof. Electrical components such as interior lights and power switch controls 13, together with map pockets, storage compartments, cloth or carpet appliques or other trim finish, speaker compartments and speaker grills, all of which are not shown but could be molded in or added onto the panel 12. A handle 24 is mounted on the front side 20 of inner liftgate trim panel 12 to allow an occupant to close the vehicle liftgate from the interior of the vehicle.

Referring now to FIGS. 1–4, the outer liftgate panel 18 is discussed in greater detail.

The outer liftgate panel 18 has a first or front side 26 and a second or rear side 28. The front side 26 of outer liftgate panel 18 is adapted to receive an outer body panel (not shown). The rear side 28 of outer liftgate panel 18 faces the backside of inner liftgate panel 12 and has mating or flanged portions 29 adapted to interface or join with mating or flanged portions 31 on the reinforcement member 14 which is secured to the second or back side 22 of inner liftgate trim panel 12. Such locations and portions are readily accessible so that workers on the vehicle assembly line can quickly secure the structural liftgate trim module to the outer liftgate panel 18 to complete assembly of the modular vehicle liftgate assembly.

An optionally retractable window glass 30 is mounted in the header 32 of outer liftgate panel 18. Water and acoustic management panels 34, preferably formed of plastic such as polyethylene, polyurethane or a closed cell foam, are mounted during final assembly on outer liftgate panel 18 to inhibit the introduction of water, noise and dust from the exterior of the liftgate into the passenger compartment.

Figure 5:
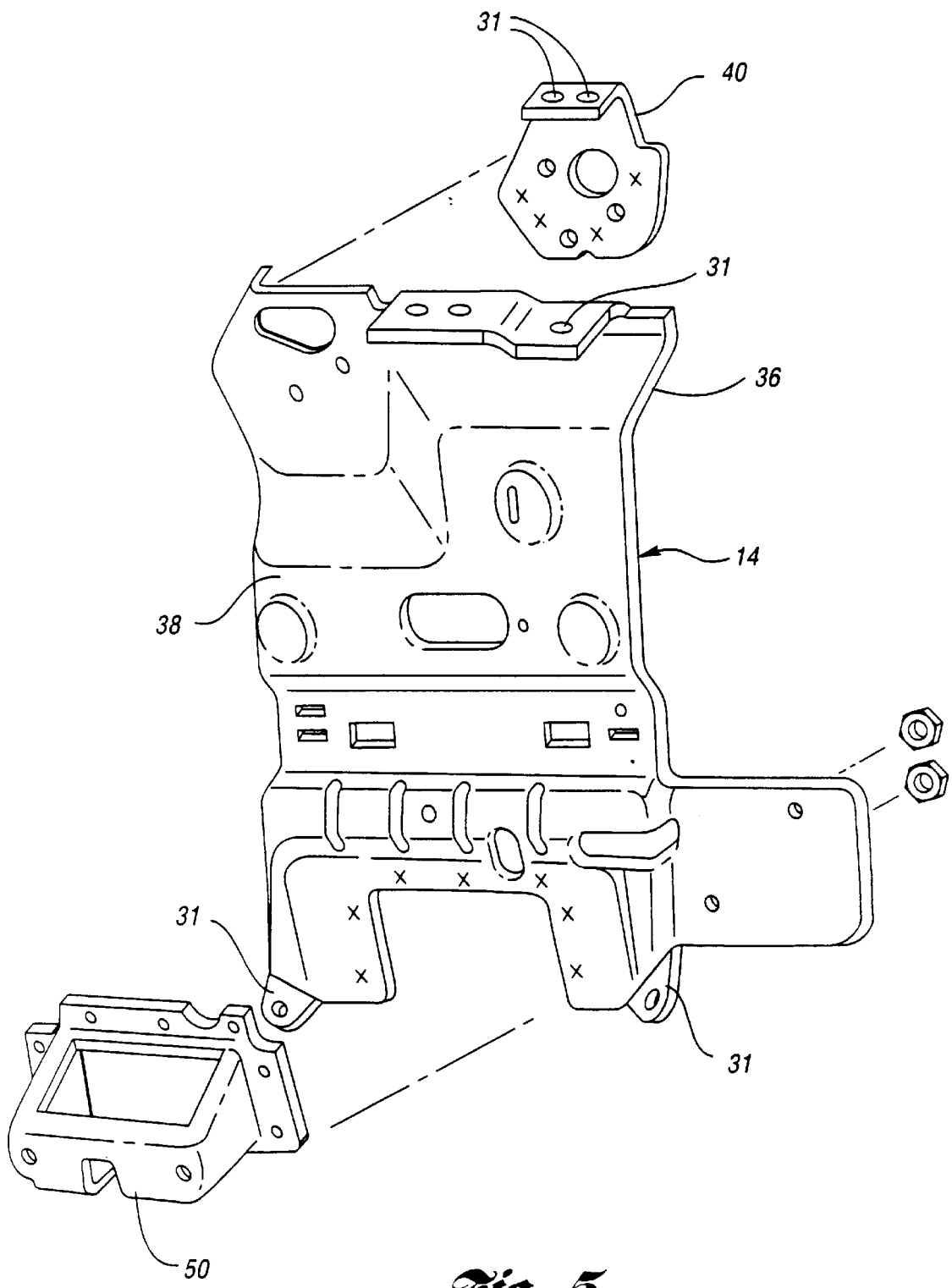
FIG. 5 is an exploded perspective view of latch reinforcement and wiper arm bracket portions of a first embodiment of the reinforcement member prior to assembly of any of the components on such first embodiment of the reinforcement member.
Figure 6:
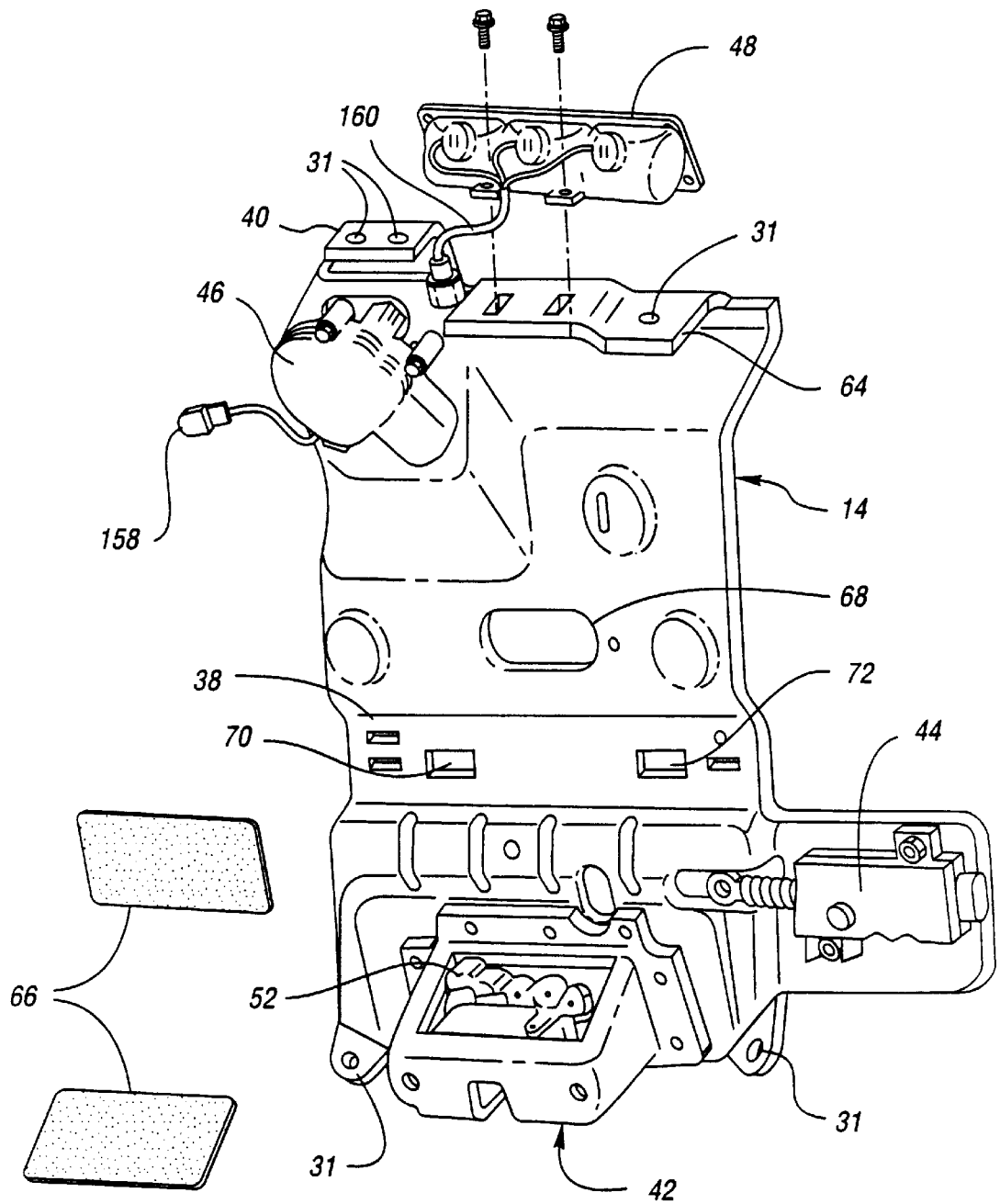
FIG. 6 is an exploded perspective view of the reinforcement member having the lock component, electronic actuator component, and wiper arm motor component installed thereon prior to assembly of the brake light component and water acoustic management panels to the first embodiment of the reinforcement member.

Referring now to FIGS. 5–6, a first embodiment of the inner liftgate trim panel reinforcement member 14 of the structural liftgate trim module 10 of the modular vehicle liftgate assembly is discussed in greater detail. Reinforcement member 14 has a first or front side 36 and a second or rear side 38. The front side 36 of reinforcement member 14 provides an increased structural rigidity characteristic to the inner liftgate trim panel 12. Additionally, reinforcement member 14 provides a structure against which a regulator component for an optionally retractable window glass 30 may be loaded. In prior structures, the regulator component was supported by the outer liftgate panel 18.

The reinforcement member 14 is formed as a metal stamping or casting for attachment to the back side 22 of the inner liftgate trim panel 12. Alternatively, the reinforcement member could be formed of a plastic such as sheet molding compounds (SMC) by compression molding. The reinforcement member 14 preferably comprises steel, magnesium, an engineered plastic or any other material with sufficient structural properties to reinforce the complete modular vehicle liftgate assembly as well as the structural liftgate trim module. The reinforcement member 14 should be sufficiently light in weight when combined with the inner liftgate trim panel 12 and the outer liftgate panel 18 so that the modular vehicle liftgate assembly is liftable by the user seeking access to the passenger compartment.

Reinforcement member 14 is adapted to receive a spot welded wiper assembly bracket portion 40, a lock and catch assembly 42, a latch actuator component 44, a wiper motor component 46 and a brake light component 48. The lock and catch assembly 42 includes a latch mounting bracket 50 spot welded to the back side 38 as a portion of reinforcement member 14. A lock assembly 52 is mounted in latch mounting bracket 50 and a liftgate outer handle assembly 54 mounted to the front side 36 of reinforcement member 14.

The preferred assembly sequence of the components to the inner liftgate trim panel reinforcement member structure for the structural liftgate trim module is discussed below. However, other alternative assembly sequences may also be used to complete the assembly of the components to the reinforcement member. First, mounting bracket 50 of lock and catch assembly 42 is spot welded to the back side 38 of reinforcement member 14 as a portion thereof. Wiper assembly bracket 40 is then spot welded to the front side 36 of reinforcement member 14 as a portion thereof. Lock assembly 52 is then inserted into mounting bracket 50, followed by the attachment of latch actuator component 44. In the preferred embodiment, latch actuator component 44 is electrically powered to allow for remote unlatching of the liftgate.

Figure 11:
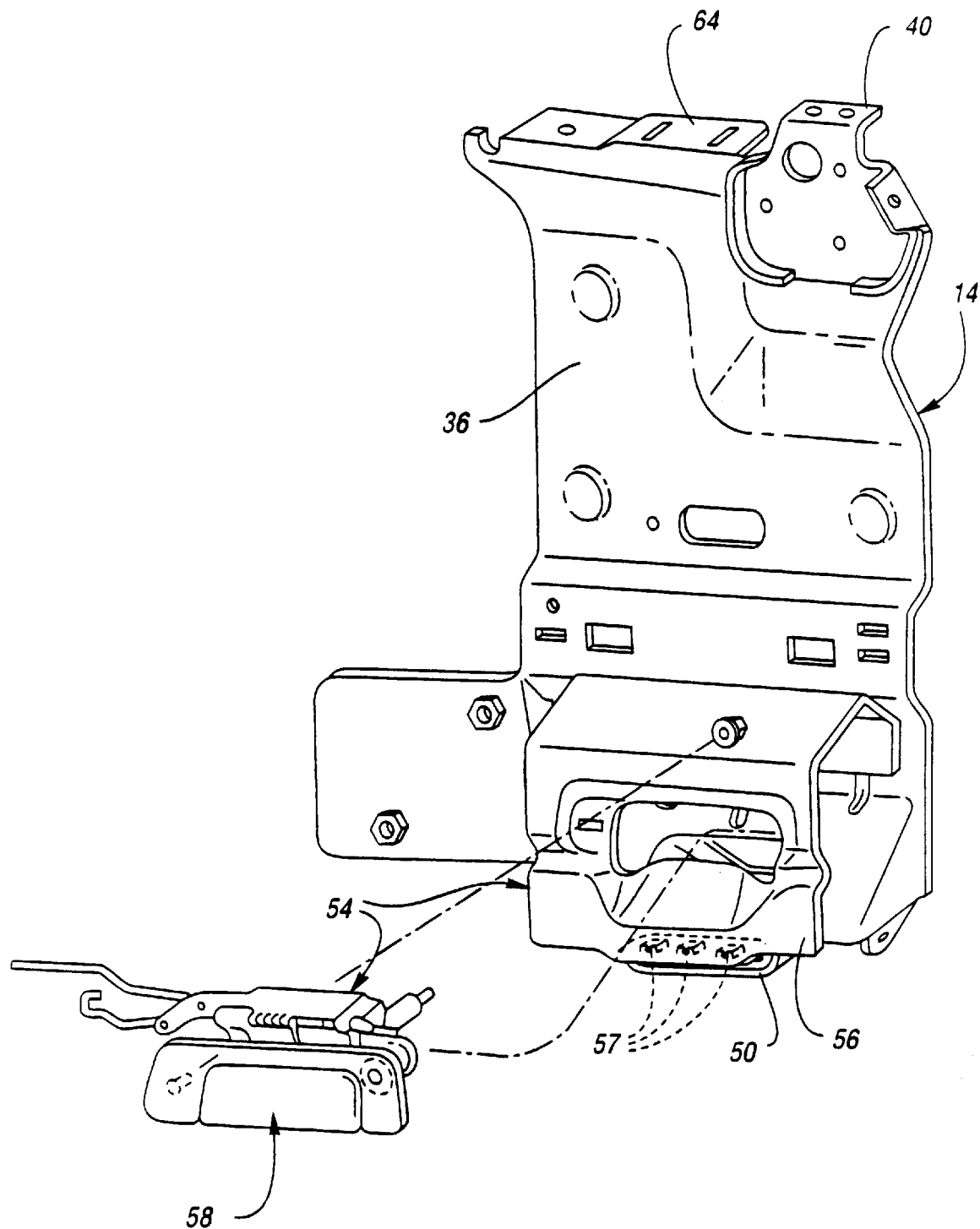
FIG. 11 is an exploded perspective view of a reinforcement member showing inner liftgate trim panel securement apertures on the reinforcement member and an exterior liftgate trim handle component prior to assembly on the first embodiment of the reinforcement member.
Figure 12:
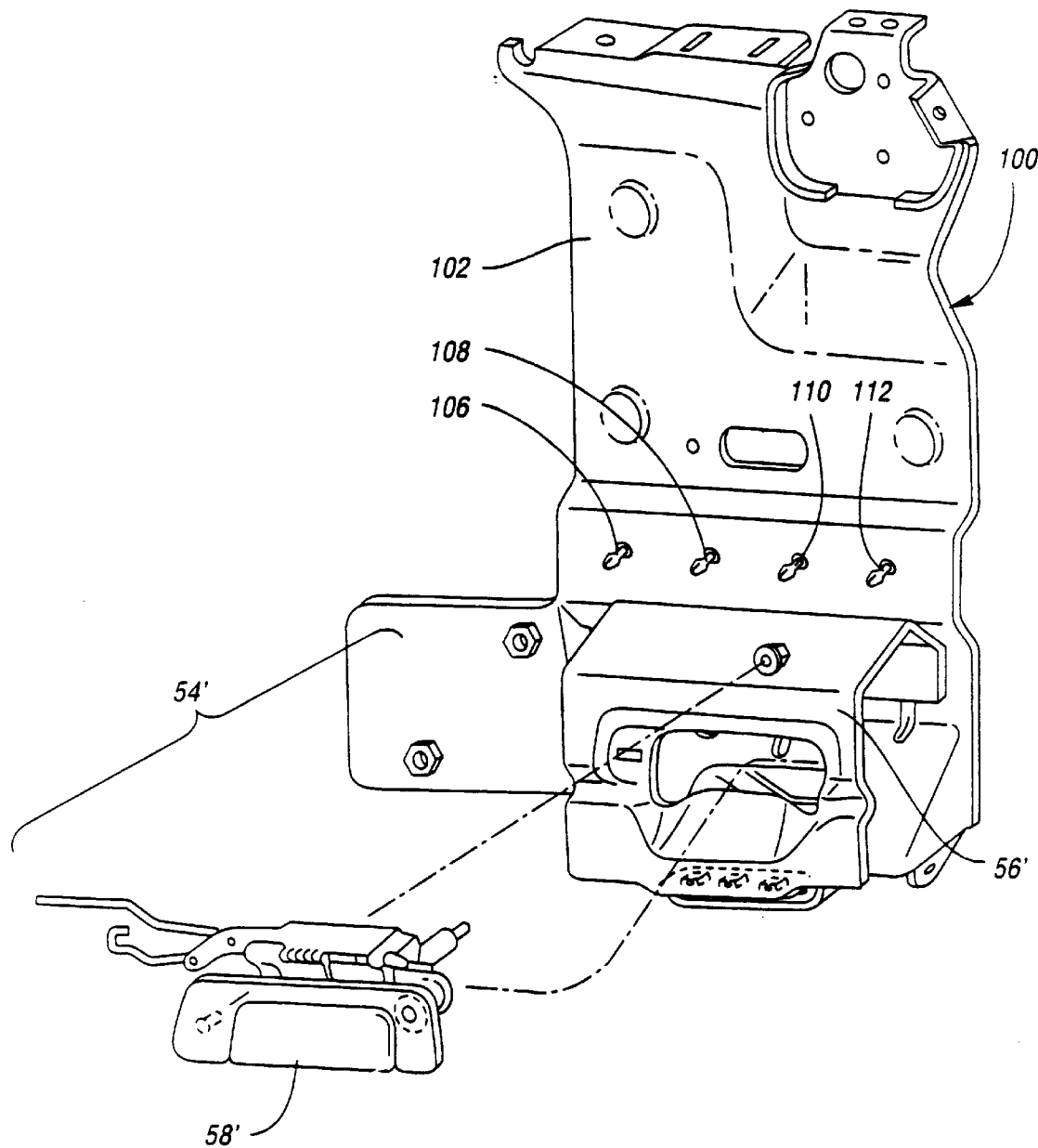
FIG. 12 is an exploded perspective view of a reinforcement member showing inner panel securement pins on the reinforcement member and an exterior liftgate trim handle component prior to assembly on the second embodiment of the reinforcement member.

Referring additionally to FIG. 11, the attachment of the liftgate outer handle assembly S4 to the front side 36 of reinforcement member 14 is described in greater detail. An exterior handle mounting bracket 56 is spot welded to the front side 36 of reinforcement member 14 as a portion thereof so that apertures 57 are aligned with hole portions 31 on a latch mounting bracket portion 50 of the reinforcement member 14. Next, the handle actuator 58 is secured in the mounting bracket 56. A lock release rod, not shown, extends as indicated at 54 between the lock assembly 52 and the exterior handle actuator 58 to operatively connect the handle actuator 58 to lock and catch assembly 42.

Referring back to FIG. 6, wiper motor 46 is mounted to the back side 38 of reinforcement member 14 directly opposite wiper assembly bracket 40 so that drive arm of wiper motor component 46 extends through aperture 62 in bracket 40. The brake light component 48 is then secured to a peripheral flange 64 of reinforcement member 14. Finally, water and acoustical management patches 66 are mounted over aperture 68 and lock and catch assembly 42 to complete the assembly.

Figure 7:
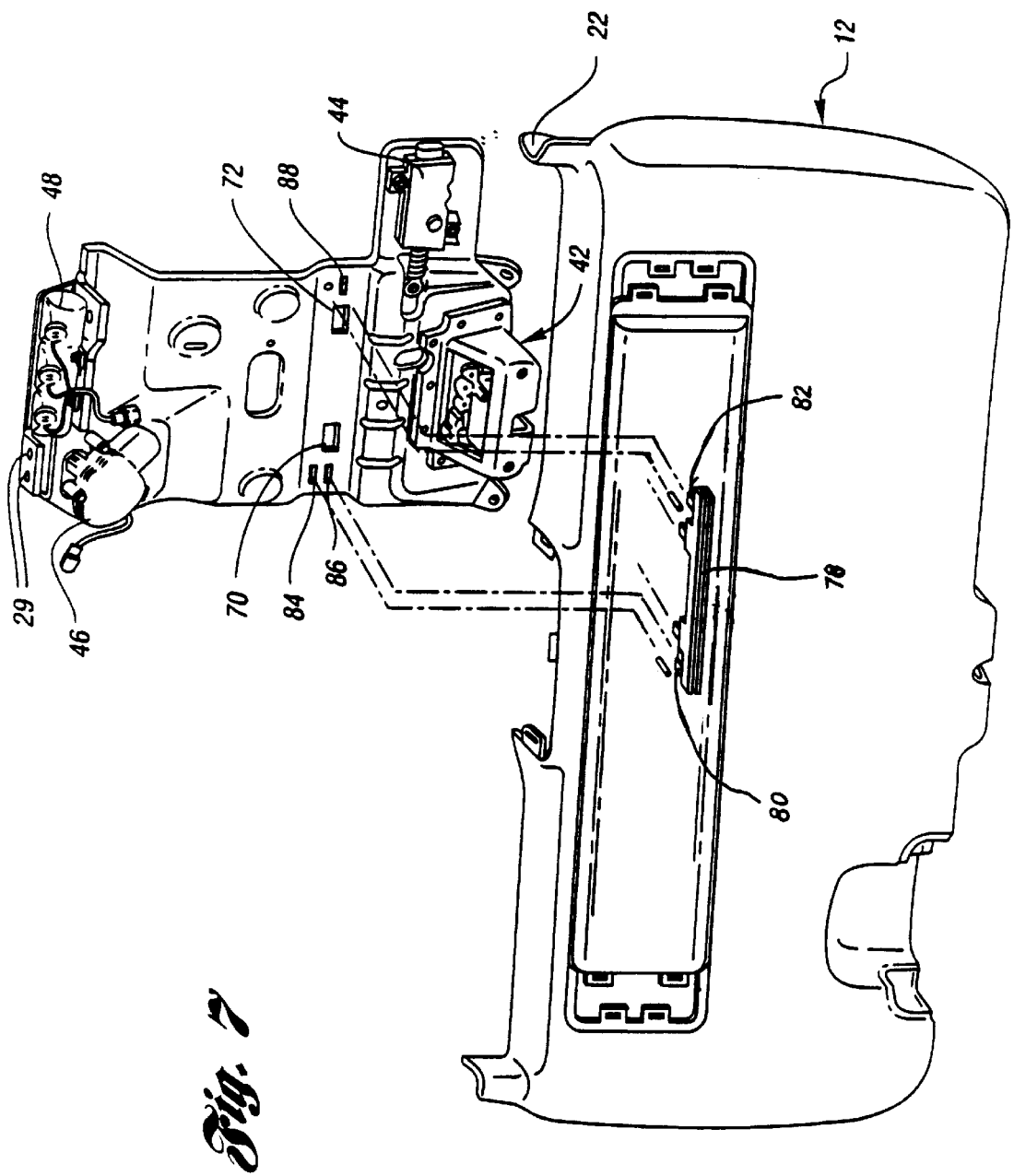
FIG. 7 is an exploded perspective view of the structural liftgate trim module showing the first embodiment of the reinforcement member, mounting clips and inner liftgate trim panel prior to their assembly with the components into a subassembly forming such structural liftgate trim module.
Figure 8:
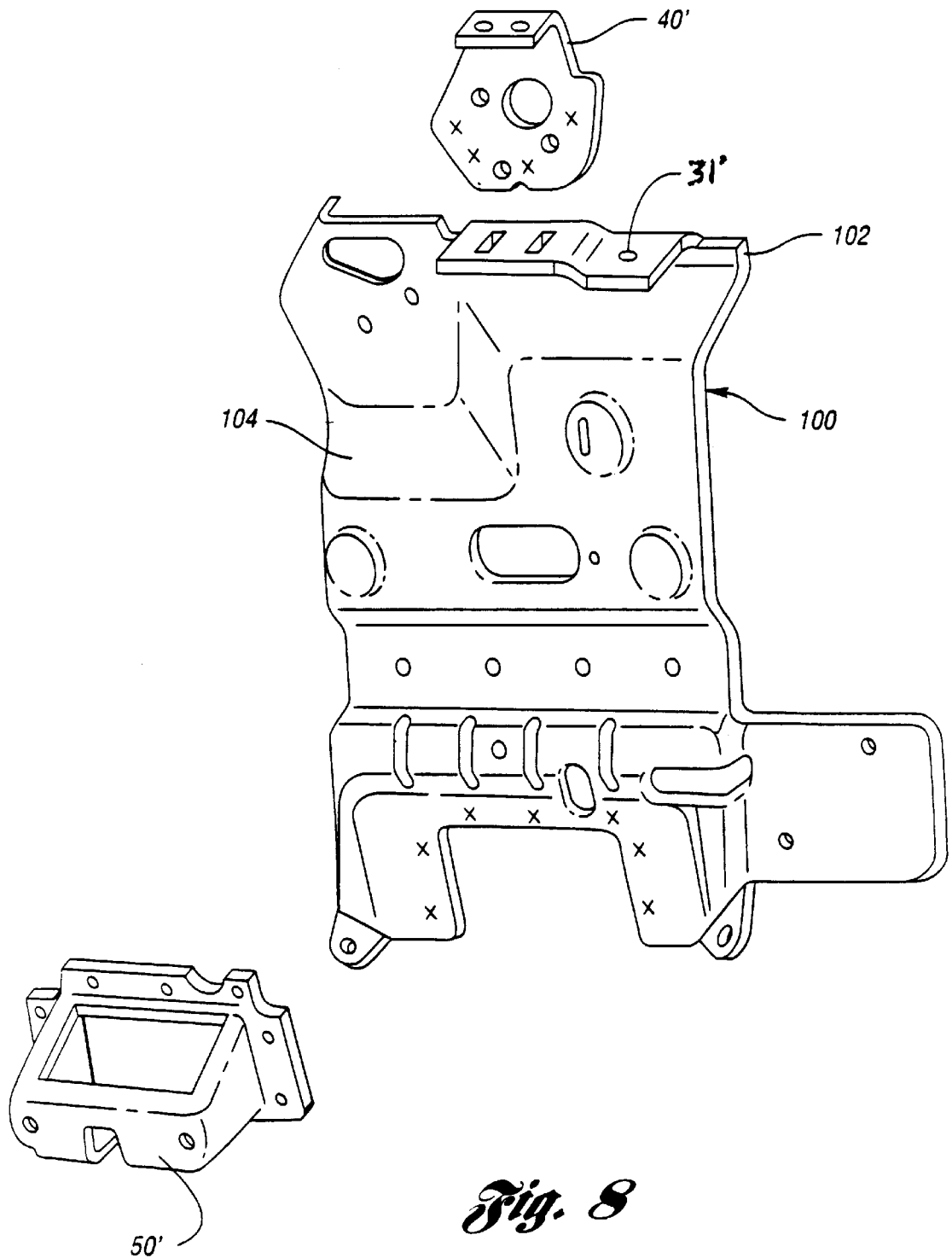
FIG. 8 is an exploded perspective view of latch reinforcement and wiper arm bracket portions of a second embodiment of the reinforcement member prior to assembly of any of the components on such second embodiment of the reinforcement member.
Figure 9:
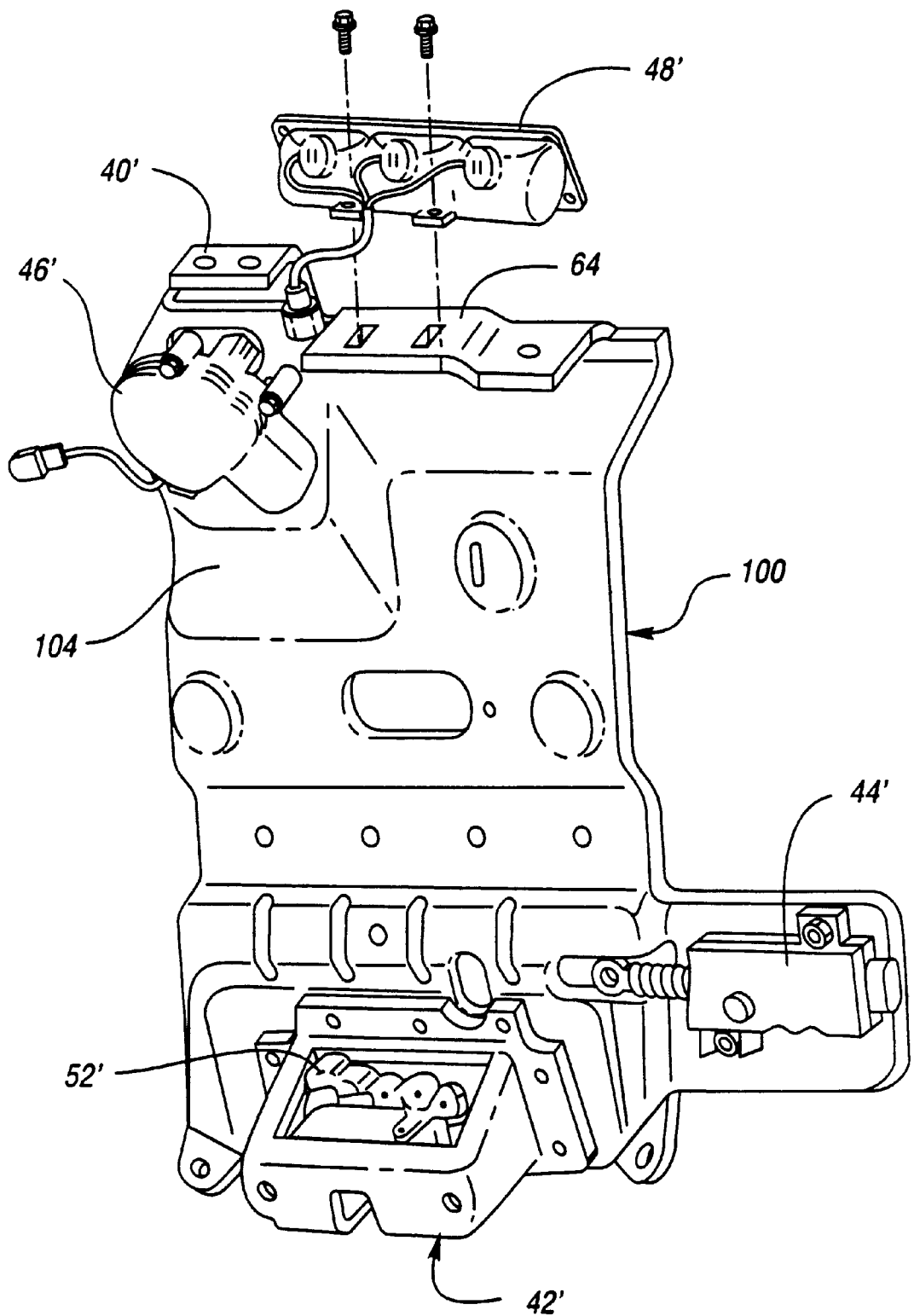
FIG. 9 is an exploded perspective view of the reinforcement member having the lock component, electronic actuator component, and wiper arm motor component installed thereon prior to assembly of the brake light component and water acoustic management panels to the second embodiment of the reinforcement member.
Figure 10:
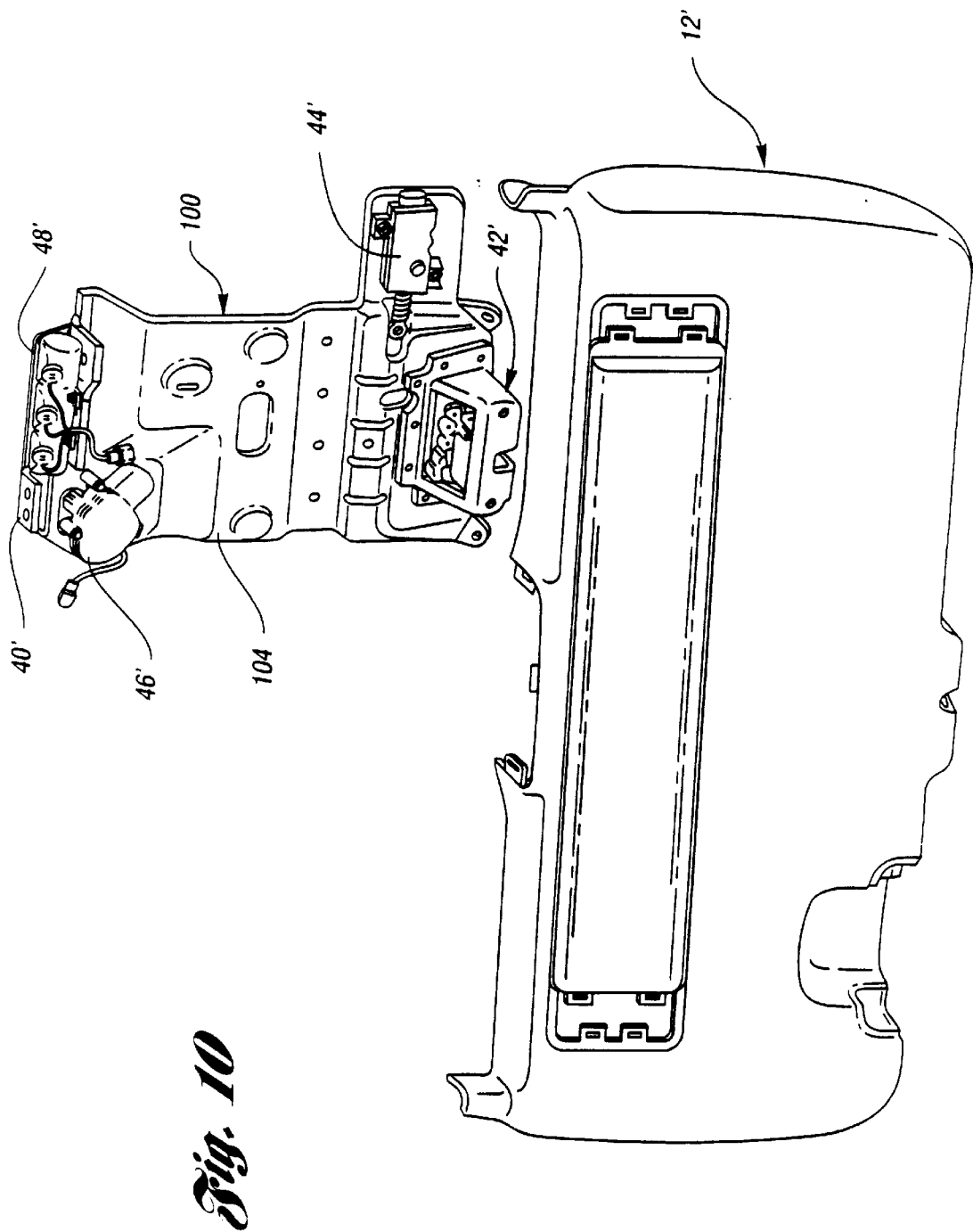
FIG. 10 is an exploded perspective view of the structural liftgate trim module showing the second embodiment of the reinforcement member with electrical components mounted thereon prior to its assembly on the inner liftgate trim panel as a subassembly forming such structural liftgate trim module.

Referring now to FIGS. 1 and 7, a preferred method of assembling the modular vehicle liftgate assembly is described in further detail. The structural liftgate trim module is built up by placing inner liftgate trim panel 12 appearance side down. Acoustic pad 150 is laid against the back side of inner liftgate trim panel 12. Next, the reinforcement member 14 is secured to inner liftgate trim panel 12. After such assembly, mating portions 31 on reinforcement member 14 will be configured and located to mate respectively with mating portions 29 at spaced locations on outer liftgate panel 18. In one embodiment of the structural liftgate trim module, apertures 70 and 72 are provided on the reinforcement member 14 to align with corresponding apertures 74 and 76 on outer liftgate panel 18. The securing of the reinforcement member to the inner liftgate trim panel is discussed in greater detail below.

Referring additionally to FIG. 14, securement of the structural liftgate trim module to the outer liftgate panel 18 is accomplished by passing fasteners 90, 92 through apertures 70, 72 into bosses and seats 71, 73 integrally formed on inner liftgate trim panel 12. The heads of fasteners 90, 92 include projections 93 which align with apertures 74, 76 on the outer liftgate panel 18 when the structural liftgate trim module is properly located on the outer liftgate panel 18. Mounting clip 78 is attached to reinforcement member 14 by fingers 80, 82 which engage slots 84, 86, 88 on reinforcement member 14. The mounting clip 78 attaches to a trim portion 89 on the back side of inner liftgate trim panel 12 to hold the inner liftgate trim panel 12 and the reinforcement member 14 in a secured arrangement until fasteners 90, 92 can be inserted through apertures 70, 72.

Referring now to FIGS. 3, 8–10, and 12, a second embodiment of the inner liftgate trim panel reinforcement member 100 of the modular vehicle liftgate assembly is shown. Many of the components used in the assembly of the first embodiment of the modular vehicle liftgate assembly are used in the assembly of the second embodiment. Common components in both the first and the second embodiments are indicated by a primed reference numeral.

Referring to the Figures, reinforcement member 100 has a first or front side 102 and a second or back side 104. Reinforcement member 100 is adapted to engage an inner liftgate trim panel 12' and an outer liftgate panel (not shown). Reinforcement member 100 is adapted to receive a spot welded wiper assembly bracket portion 40', a lock and catch assembly 42', a latch actuator component 44', a wiper motor component 46' and a brake light component 48'. The lock and catch assembly 42' includes a latch mounting bracket 50' spot welded to the back side 104 of reinforcement member 100 as a portion thereof, a lock assembly 52' in latch mounting bracket 50' and a liftgate outer handle assembly 54' mounted to the front side 102 of reinforcement member 100.

Figure 3:
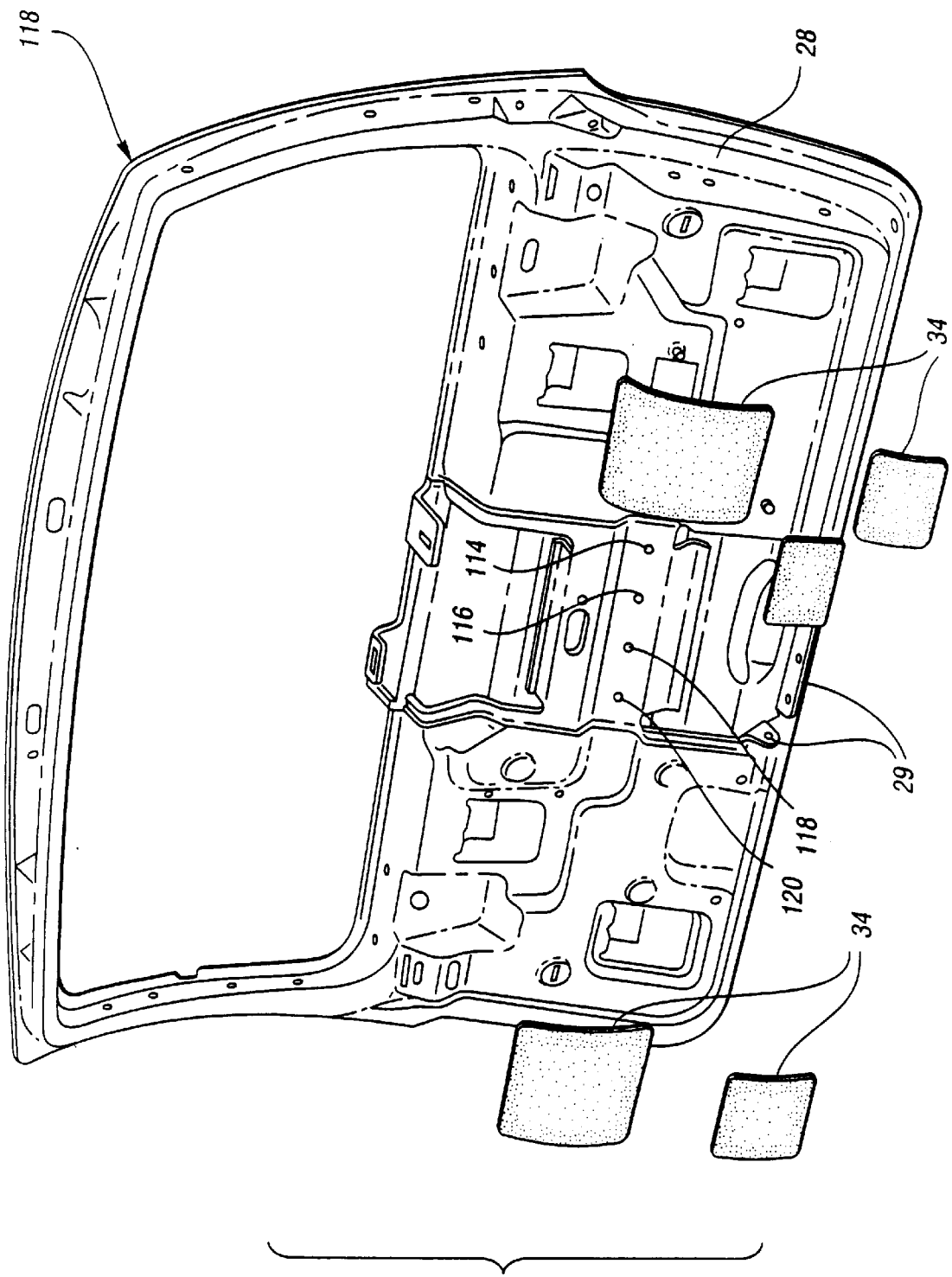
FIG. 3 is an exploded perspective view of the outer liftgate panel subassembly prior to assembly of water acoustic management panels to the outer liftgate panel.
Figure 4:
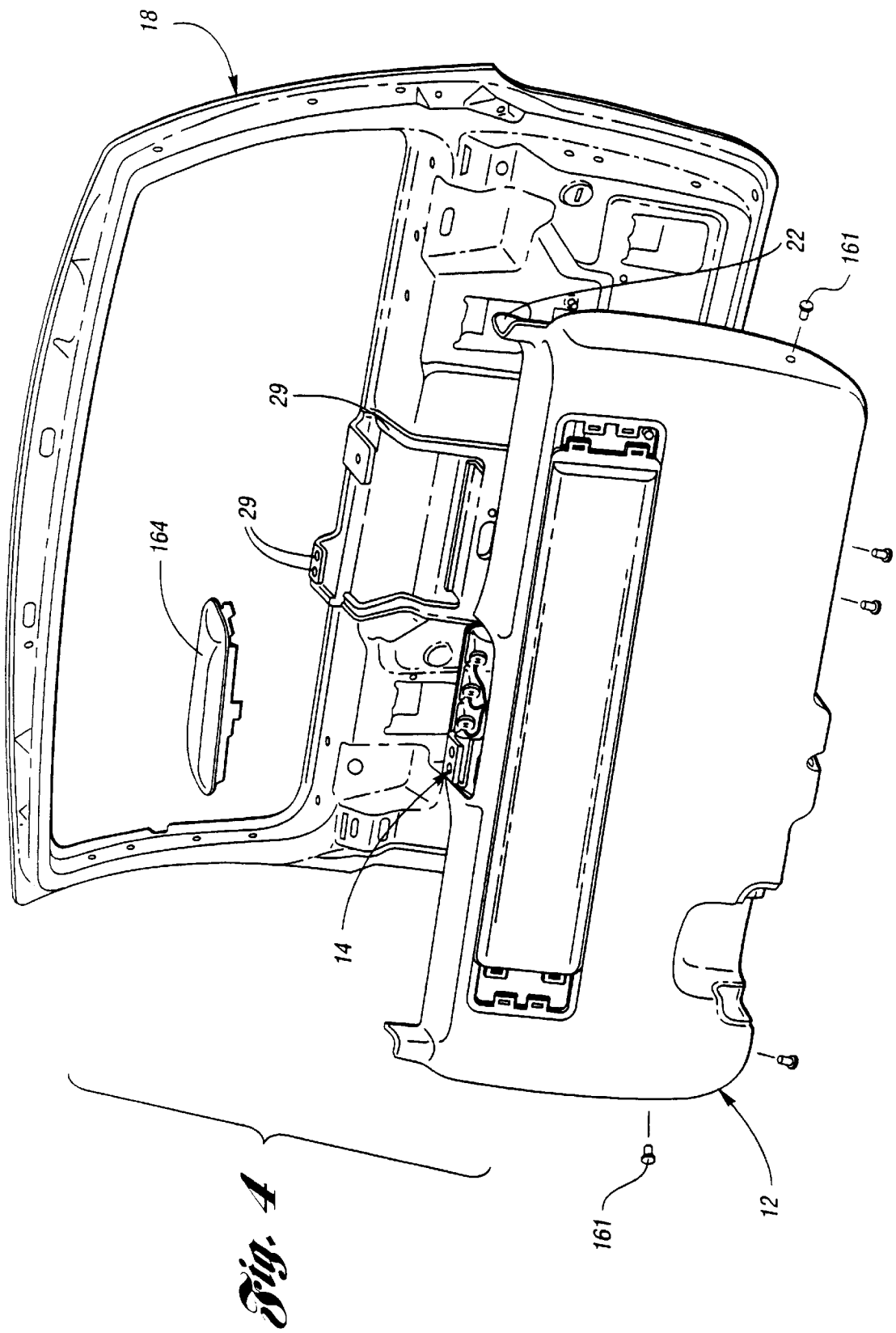
FIG. 4 is an exploded perspective view of a liftgate assembly showing a sub-assembled structural liftgate trim module having an inner liftgate trim panel with lamp covers removed, inner liftgate trim panel reinforcement member with pretested components thereon, and upper close out trim poised for assembly as a unit with an outer liftgate panel.

Referring additionally to FIG. 3, reinforcement member 100 is provided with a series of pins 106, 108, 110, 112 on the front side 102 of reinforcement member to align the reinforcement member 100 to an outer liftgate panel by insertion into respective apertures 114, 116, 118 and 120 on outer liftgate panel 18. In the preferred embodiment, pins 106, 108, 110, 112 are integrally formed on the front side 102 of reinforcement member 100. Pins 106, 108, 110, 112 and apertures 114, 116, 118, 120 replace apertures 70, 72, 74, 76 and fasteners 90, 92 in the first embodiment of the invention to align the inner liftgate trim panel and reinforcement member 100 to the outer liftgate panel during the assembly process.

Referring now to FIGS. 1, 7 and 13, a preferred method of assembly of the modular vehicle liftgate assembly of the first embodiment of structural liftgate trim module 10 is discussed in greater detail. An acoustical management sheet 150, preferably formed of plastic such as polyethylene, polyurethane or a closed cell foam, may be provided to inhibit noise transfer in the passenger cabin. A wiring harness 152 carries electrical current to plug-in connectors 154, 156, 158, 160 for all necessary components, including electric actuator mechanism 44, rear wiper motor 46 and brake light 48. The harness 152 is attached to the inner liftgate trim panel 12 as necessary, preferably by positioning some or all of its length within channels or hooks (not shown) molded into the inner liftgate trim panel or the reinforcement member. Instead of the electrical connector section 161, the harness 152 may be provided with a conventional pass through including a seal integral with the harness at the liftgate-to-body pass through point to inhibit water seepage into the liftgate cavity, as shown in U.S. patent application Ser. No. 08/799,199, filed Feb. 13, 1997, and titled "Motor Vehicle Door Module", assigned to the assignee of the present invention and hereby incorporated by reference.

The assembled structural liftgate trim module 10 which includes the inner liftgate trim panel 12 and the reinforcement member 14 is adapted to mount to the outer liftgate panel or sheet metal liftgate exterior by bringing it adjacent the liftgate exterior, and locating the electrical connector section 161 with its mating section (not shown) if so provided on the outer liftgate panel. The structural liftgate trim module 10 is aligned with the outer liftgate panel 18 by extensions on fasteners 90, 92 in apertures 74, 76 or by pins 106, 108, 110 and 112 in apertures 114, 116, 118 and 120. The structural liftgate trim module is then secured to the outer liftgate panel 18 at the reinforcement member 14 with either a plurality of bolts or screws through flanged portions 31 on the reinforcement member at corresponding locations of portions 29 on the outer liftgate panel 18. Finally, the structural liftgate trim module 10 is secured around its periphery by the screws 162 into the bottom and sides of the outer liftgate panel 18 to complete the assembly of the modular vehicle liftgate assembly.

One significant advantage of the modular vehicle liftgate assembly of the present invention, however, is that its electrical components can be tested prior to assembly of the structural liftgate trim module with the outer liftgate panel 18. In another embodiment of the assembly process, the reinforcement member 14 may be assembled with inner liftgate trim panel 12 to form the structural liftgate trim module 10 without one or more of the electrical components attached. For example, brake light 48 may be attached to the reinforcement member 14 after the reinforcement member has been mated with the inner liftgate trim panel 12. Electrical components can be accessed on reinforcement member 14 through upper closeout trim 164 connected to an upper portion of inner liftgate trim panel 12.

While the embodiments of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. A structural liftgate trim module for combining with and reinforcing a liftable outer liftgate panel of a motor vehicle to make a modular vehicle liftgate trim assembly, the structural liftgate trim module comprising:

an inner liftgate trim panel having an inner appearance side and an outer side having a structural characteristic, the inner appearance side being adapted to face into a passenger compartment of the motor vehicle and the outer side being adapted to face the outer liftgate panel; and an inner liftgate trim panel reinforcement member having an inner side adapted to mount to the outer side of the inner liftgate trim panel to provide the structural characteristic and an outer side adapted to interface with the outer liftgate panel, the inner liftgate trim panel reinforcement member being sufficiently light to be liftable in the liftgate assembly and having spaced portions adapted to interface with the outer liftgate panel in respective spaced locations with each spaced portion being readily accessible and operable to detachably and structurally secure the inner liftgate trim panel in an easy-on, easy-off combination with the outer liftgate panel.

2. The structural liftgate trim module of claim 1 wherein the spaced locations are on opposite sides of the inner liftgate trim panel so that the spaced portions of the inner liftgate trim reinforcement are more readily accessible when securing the inner liftgate trim panel in combination with the outer liftgate panel.

3. The structural liftgate trim module of claim 1 including a lock and catch assembly for selectively locking and unlocking the outer liftgate panel with respect to the motor vehicle when the inner liftgate trim panel and inner liftgate trim panel reinforcement member are secured in combination with the outer liftgate panel, the lock and catch assembly being sufficiently adjacent to one of the spaced portions of the inner liftgate trim panel reinforcement member that the lock is readily accessible and operable to detachably and structurally secure the lock and catch assembly in combination with the outer liftgate panel in one of the spaced locations when the inner liftgate trim panel is secured in combination with the outer liftgate panel.

4. The structural liftgate trim module of claim 3 wherein one of the spaced portions of the inner liftgate trim panel reinforcement member is configured substantially normal to the inner liftgate trim panel adjacent the lock and catch assembly to cause the one of the spaced portions in one of the spaced locations to interface with a peripheral portion of the outer liftgate panel when both the inner liftgate trim panel and the lock and catch assembly are secured in combination with the outer liftgate panel.

5. The structural liftgate trim module of claim 3 wherein the lock and catch assembly is mounted on the inner liftgate trim panel reinforcement member, the lock and catch assembly comprising a latch mounting bracket and a lock assembly mounted within the latch mounting bracket.

6. The structural liftgate trim module of claim 1 wherein the lock and catch assembly further comprises a handle for operating the lock and catch assembly, the handle adapted to extend into an exterior hand grab position through the outer liftgate panel when the inner liftgate trim panel and inner liftgate trim panel reinforcement member are secured in combination with the outer liftgate panel.

7. The structural liftgate trim module of claim 1 wherein the inner liftgate trim panel reinforcement member further comprises at least one connecting portion provided on the inner side of the inner liftgate trim panel reinforcement member.

8. The structural liftgate trim module of claim 1 further comprising a retaining member removably mounted to the at least one connecting portion of the inner liftgate trim panel reinforcement member, the retaining member engaging a portion of the outer side of the inner liftgate trim panel to hold the inner liftgate trim panel reinforcement member and the inner liftgate trim panel in a locking engagement prior to assembly of the structural liftgate trim module.

9. The structural liftgate trim module of claim 1 wherein the inner liftgate trim panel further comprises at least one seat provided on the outer side of the inner liftgate trim panel, the at least one seat being adapted to receive at least one fastener.

10. The structural liftgate trim module of claim 1 wherein the inner liftgate trim panel reinforcement member further comprises at least one aperture extending through the inner liftgate trim panel reinforcement member in a corresponding relationship to the at least one seat on the outer side of the inner liftgate trim panel.

11. The structural liftgate trim module of claim 1 wherein the outer liftgate panel further comprises at least one aperture in a corresponding relationship with the at least one seat on the outer side of the inner liftgate trim panel and the at least one aperture on the inner liftgate trim panel reinforcement member, the at least one aperture of the outer liftgate panel adapted to receive a fastener mounted in the at least one seat.

12. The structural liftgate trim module of claim 1 wherein the outer liftgate panel has at least one aperture and wherein the inner liftgate trim panel reinforcement member further comprises at least one fastener member integrally formed an the outer side of the reinforcement member corresponding to the at least one aperture of the outer liftgate panel to lockingly engage the structural liftgate trim module and the outer liftgate panel.

13. The structural liftgate trim module of claim 1 wherein the inner liftgate trim panel reinforcement member is configured to resist crash loads impacting the motor vehicle.

14. The structural liftgate trim module of claim 1 wherein the inner liftgate trim panel reinforcement member comprises metal.

15. The structural liftgate trim module of claim 1 wherein the inner liftgate trim panel reinforcement member comprises plastic.

16. The structural liftgate trim module of claim 1 wherein the inner liftgate trim panel is injection molded.

17. The structural liftgate trim module of claim 1 wherein the inner liftgate trim panel is compression molded.

18. The structural liftgate trim module of claim 1 wherein the inner liftgate trim panel comprises polyolefin thermoplastic.

19. The structural liftgate trim module of claim 1 wherein the inner liftgate trim panel comprises polypropylene.

20. The structural liftgate trim module of claim 1 wherein the inner liftgate trim panel comprises acrylonitrile-butadiene-styrene.

21. The structural liftgate trim module of claim 1 wherein the inner liftgate trim panel comprises a glass-reinforced composite.

22. The structural liftgate trim module of claim 1 wherein a wiper bracket assembly is mounted to the inner liftgate trim panel reinforcement member.

23. The structural liftgate trim module of claim 22 wherein the wiper bracket assembly is spot welded to the inner liftgate trim panel reinforcement member.

24. The structural liftgate trim module of claim 22 wherein a wiper motor is attached to the wiper bracket assembly.

25. The structural liftgate trim module of claim 1 wherein at least one electrical component is mounted on the inner liftgate trim panel reinforcement member of the structural liftgate trim module.

26. The structural liftgate trim module of claim 25 wherein at least one electrical component includes an electric actuating mechanism mounted to the inner liftgate trim panel reinforcement member.

27. The structural liftgate trim module of claim 26 wherein the electric actuating mechanism is adapted to be coupled with a lock and catch assembly to open and close the liftgate trim.

28. The structural liftgate trim module of claim 25 wherein the at least one electrical component is a brake light assembly mounted to the inner liftgate trim panel reinforcement member.

29. The structural liftgate trim module of claim 1 further comprising a wiring harness connected to the outer side of the inner liftgate trim panel.

30. The structural liftgate trim module of claim 29 including a wiper motor component mounted on the inner liftgate trim panel reinforcement member and wherein the wiring harness is connected to the wiper motor.

31. The structural liftgate trim module of claim 29 including an electric actuating mechanism mounted on the inner liftgate trim panel reinforcement member and wherein the wiring harness is connected to the electric actuating mechanism.

32. The structural liftgate trim module of claim 29 including a brake light assembly mounted on the inner liftgate trim panel reinforcement member and wherein the wiring harness is connected to the brake light assembly.

33. The structural liftgate trim module of claim 25 including a water management panel mounted between the inner and outer liftgate trim panels.

34. The structural liftgate trim module of claim 33 wherein the water management panel includes a flange on the inner liftgate trim panel reinforcement member and a belt line glass seal attached to the flange as part of the water management system.

35. The structural liftgate trim module of claim 33 wherein the water management panel is a sheet configured to conformingly seal the at least one electrical component mounted to the inner liftgate trim panel reinforcement member.

36. A modular vehicle liftgate assembly for a motor vehicle comprising an outer liftgate panel having a peripheral flange defining an opening, and a structural liftgate trim module insertable into said opening and having a plurality of electrical components testable and adjustable before said structural liftgate trim module is inserted into said opening, said structural liftgate trim module including:

an inner liftgate trim panel having an inner appearance side and an outer side having a structural characteristic for the vehicle liftgate trim assembly, the inner appearance side being adapted to face into a passenger compartment of the motor vehicle and the outer side facing the outer liftgate panel; and an inner liftgate trim panel reinforcement member having an inner side adapted to mount on the outer side of the inner liftgate trim panel to provide the structural characteristic and outer side adapted to interface with the outer liftgate panel, the inner liftgate trim panel reinforcement member having spaced portions at least one of which interfaces with the peripheral flange of the outer liftgate panel and with the peripheral flange of the outer liftgate panel and with each spaced portion being readily accessible and operable to detachably and structurally secure the inner liftgate trim panel in an easy-on, easy-off combination with the outer liftgate panel.

37. The vehicle liftgate trim assembly of claim 36 wherein the peripheral flange extends between the inner liftgate trim panel and the outer liftgate panel.

38. A method of assembling a modular liftgate assembly for a motor vehicle comprising:

providing an outer liftgate panel with a peripheral flange having a first flange portion substantially normal to the outer liftgate panel and a second flange portion spaced from the first portion and substantially parallel to the outer liftgate panel;

forming a structural liftgate trim module comprising an inner liftgate trim panel having an inner appearance side and an outer side having a structural characteristic, the inner appearance side being adapted to face into a passenger compartment of the motor vehicle and the outer side being adapted to face the outer liftgate panel;

mounting an inner liftgate trim panel reinforcement member on the outer side of the inner liftgate trim panel to provide the structural characteristic of the inner liftgate trim panel, and forming at least one spaced reinforcement flange portions on the inner liftgate trim panel reinforcement member adapted to interface respectively with the first and second flange portions on the outer liftgate panel;

positioning the structural liftgate trim module adjacent the outer liftgate panel so that one of the at least one reinforcement flange portions is readily accessible and interfaces with the first outer liftgate panel flange portion and another of the at least one reinforcement flange portions is readily accessible and interfaces with the second outer liftgate panel flange portion; and detachably securing the structural liftgate trim module to the outer liftgate panel by fastening each of the at least one reinforcement flange portions to a respective outer liftgate panel flange portion whereby to reinforce the outer liftgate panel with the structural liftgate trim module.

39. The method of assembling the modular liftgate assembly of claim 38 including:

installing as a part of the structural liftgate trim module at least one electrical component on the outer side of the inner liftgate trim panel reinforcement member and sealing the outer side and the electrical component with a watershield before the structural liftgate trim module is positioned adjacent the outer liftgate panel whereby to shield the electrical component and the passenger compartment of the vehicle from the deleterious effects of water, noise and dust.

* * * * *